United States Patent Office 3,691,016
Patented Sept. 12, 1972

3,691,016
PROCESS FOR THE PREPARATION OF
INSOLUBLE ENZYMES
Ravindra P. Patel, Boston, Mass., assignor to
Monsanto Company, St. Louis, Mo.
No Drawing. Continuation-in-part of application Ser. No.
779,248, Nov. 26, 1968, which is a continuation-in-part
of application Ser. No. 560,100, June 24, 1966. This
application Apr. 17, 1970, Ser. No. 29,673
Int. Cl. A61k *19/00;* C07g *7/02*
U.S. Cl. 195—68
14 Claims

ABSTRACT OF THE DISCLOSURE

Insoluble enzymes are prepared by esterifying a carboxyl moiety with a compound capable of forming an activated ester with the carboxyl moiety and then condensing the activated ester with an amine moiety. At least a portion of either the carboxyl moiety or the amine moiety must be an enzyme. Exemplary of the ester forming compound is N-ethyl-5-phenyl isooxazolium-3-sulfonate.

---

This application is a continuation-in-part of Ser. No. 779,248 filed Nov. 26, 1968 which application Ser. No. 779,248 is a continuation-in-part of Ser. No. 560,100 filed June 24, 1966, both now abandoned.

This application relates to enzymes which have been rendered insoluble and to a process for preparing insoluble enzymes.

Recently it has become known that certain enzymes may be rendered insoluble in water, and still retain a substantial amount of their reactivity. The insolubilization is achieved by the so-called anhydride method, whereby enzymes such as trypsin are linked to a polycarboxylic acid, such as a copolymer of ethylene and maleic anhydride.

It is an object of this invention, to provide another process whereby chymotrypsin, and other enzymes, such as lipase, amylase, neutral protease, alkaline protease, amyloglucosidase and the like may be rendered insoluble while yet retaining a significant amount of the enzyme's original activity.

It is a further object of this invention to provide new and novel insolubilized yet active enzymes.

Other advantages of the present invention will be apparent from the specification and appended claims.

In accordance with this invention, there is provided a process for preparing insoluble enzymes by first esterifying a carboxyl moiety with a compound capable of forming an activated ester with the carboxyl moiety, then condensing the thus formed activated ester with an amine moiety. In the process it is essential that at least a portion of either the carboxyl moiety, or the amine moiety be an enzyme.

In a specific embodiment of the present invention an insoluble enzyme is prepared by dissolving a water-soluble enzyme containing both carboxyl and primary amine moieties in water, adding a 3-unsubstituted isooxazolium salt in a minor molar amount with respect to the carboxyl moiety, reacting the salt and a carboxyl moiety to obtain an activated ester, condensing the activated ester with an amine moiety to produce a water-insoluble enzyme product of increased molecular weight which contains amide linkages.

The carboxyl values utilized in the formation of the activated ester are supplied from either one of two sources, or a combination thereof. The first source being the enzyme which is being rendered insoluble, and the second source being a polyacidic polymer. Typical polycarboxyl polymers include (1) copolymers of a hydrocarbon olefin and a monomer selected from the group consisting of unsaturated polycarboxylic acids, their anhydrides, and salts as well as polymers which are polymerized ethylenically unsaturated acids, (2) homopolymers of polymerizable acids, e.g. polyacrylic and (3) carboxymethylcellulose polymers. Typical copolymers include copolymers of styrene and maleic anhydride, ethylene and maleic anhydride, ethylene/crotonic acid copolymers, and other copolymers where the acid portion may contain one or more of the following: fumaric acid, itaconic acid, citraconic acid, aconitic as well as the appropriate anhydrides and salts thereof. Other olefinic monomers, which may be employed in preparing the foregoing copolymers, include isobutylene, octene-1, alpha-methyl styrene, vinyl acetate, vinyl formate, vinyl alkyl ethers, alkyl acrylates and the like. The amount of olefinic monomer employed with respect to the acid comonomer on a mole basis can be varied over the range from about 1:3 to about 3:1.

Among the acids employed to make commercial polymers of polymerized acids are acrylic acid, amic acids, e.g. glutamic acid and methacrylic acid. The carboxymethylcellulose polymers are another group of polymers useful in preparing the insoluble active enzymes of this invention.

While for the purposes of this invention the molecular weight of the acid copolymer is not a paramount consideration, it is convenient if the copolymer employed be as such molecular weight that it is still water soluble. A satisfactory molecular weight range would be from about the order of less than one thousand, to about 300 to 350 thousand and more, depending on the particular polymer employed. Crosslinked versions of the foregoing may also be employed and in such cases the polymer will have an infinite molecular weight. The ratio of the carboxyl moiety employed in the process to the amine may be varied over wide weight ranges, depending upon the end use of the insoluble product, activity desired, reactants employed and conditions for recovering the insoluble material.

The amine values utilized in the present invention, are supplied from either one of two sources, or a combination thereof. One source is the enzyme itself, and the other is a reactive amine, that is an amine such as a polymeric amine which is capable of forming amide linkages with the activated ester under reaction conditions which do not tend to inactivate the enzyme. Examples of such amines include polyallylamine, polyvinylamine, polyvinyl p-aminobenzene, and amino derivatives of carboxylic acids and anhydrides, such as maleic, citraconic, itaconic and acrylic. Other examples of reactive amines will be apparent to one skilled in the art of chemistry.

The ester forming compound utilized in the present invention, may be any suitable compound capable of forming an activated ester by reaction with the carboxyl moiety, previously referred to herein, under suitable reaction conditions, that is reaction conditions which do not tend to inactivate enzymes. Examples of such ester forming compounds include the 3-unsubstituted isooxazolium salts, for example, salts of N-loweralkyl-5-phenyl isooxazolium such as N-ethyl-5-phenyl isooxazolium-3-sulfonate and N-t-butyl-5-methyl isooxazolium-3-sulfonate. Additional examples include the carbodiimides such as 1-ethyl-3-(3-dimethylaminopropyl) carbodiimide, 1-cyclohexyl-3-(2-morpholinoethyl) carbodiimide metho p-toluenesulfonate and 1-propyl-3(3-dimethylaminopropyl) carbodiimide; the carbodiimidazoles such as 1-ethyl-3-(3-dimethylaminopropyl) carbodiimidazole and 1-methyl-3-(3-dimethylaminopropyl) carbodiimidazole; mixtures of nitrated phenols such as dinitrophenol with carbodiimides; and mixtures of halogenated phenols such as dichlorophenol with carbodiimides. A preferred class of ester forming compounds are the 3-unsubstituted isooxazolium salts with N-ethyl-5-phenyl isooxazolium-5-sulfonate being particularly preferred. The amount of ester forming compound which can be employed may vary over a wide range. It is preferable that the ratio of ester forming compound to carboxyl moiety on a molar weight basis, be less than 1:1, with best results being obtained when the ratio is less than 0.5:1, i.e. a range of from 0.5:1 to 0.025:1. An especially preferred range is from 0.4:1 to 0.04:1.

From the foregoing, it is, of course, apparent that enzymes may be employed without the use of a carboxylic moiety or an amine moiety other than the enzyme itself. It is essential, however, that at least a portion of either the carboxyl moiety or the amine moiety be an enzyme.

In carrying out the process of the present invention, any suitable temperature may be employed, that is, any temperature which does not tend to inactivate the enzyme. Temperatures above about 60° C. should generally be avoided. The process is readily carried out at ambient room temperature. The temperature of choice, however, will of course vary depending principally upon the particular enzyme used, with a temperature in the range of from about −5 to about 30° C. being generally employed. A temperature in the range of from about 0 to about 10° C. is preferred. In carrying out the process of the present invention, it is desirable to maintain the pH of the reaction media just on the acid side, so as to permit the formation of $Na^+$, $K^+$, and $Ca^{++}$ salts, that is about a pH of about 6.5 to 7.0.

The reaction is conveniently carried out in a solvent medium using any suitable solvent, such as, for example, water. The insoluble enzyme product may then be recovered from the reaction medium by any suitable means, such as, for example, by adjusting the pH downward to in the range of from about 3 to about 4 with a suitable acid, for example, a mineral acid such as hydrochloric acid or an organic acid such as acetic acid.

The insoluble enzymes prepared by the process of this invention retain a large percentage of their original selective reactivity and have the added advantage that they may be readily recovered from the media in which they are employed since they are now insoluble.

In addition to having improved stability these insoluble enzymes have many valuable uses. When these reactions are used coatings applicable to the external surface (enamel) and internal surfaces (dentyne) of the teeth are formed. Treatment of this type involves preparing active ester of a carboxyl-containing polymer, such as hydrolyzed ethylene maleic anhydride, and reacting the active ester polymer with the amino groups of the tooth protein. Such a treatment forms a very tough insoluble but durable coating to seal off the teeth from sugars and other food particles which would cause decay of the surfaces. Also when this coating is applied to a cavity prior to filling, the coating would prevent decay under the filling. Such a treatment also makes possible the use of plastic fillings for teeth. In such cases the coating would act as a cement to hold the plastic filling in place.

In a similar manner the insoluble products find use as protective coatings in the treatment of cuts, burns and sores, lesions and the like of living tissue. These coatings dry to an insoluble film which seals the damaged area and protects it until the flesh can knit together. Additionally the insoluble enzymes as enzymatically active membranes could have use as fuel cell catalysts.

The following examples are illustrative of the invention. In each of the examples unless otherwise specified all parts are parts by weight and all degrees are degrees centigrade.

EXAMPLE 1

A copolymer of ethylene and maleic anhydride (EMA) (mole ratio approximately 1:1) having a molecular weight of about 2,000 was hydrolyzed and converted to the half sodium salt to insure water solubility. Six hundred milligrams of EMA salt were dissolved in 10 milliliters of water. To the solution was added 10 millimeters of a 2 percent aqueous solution of N-ethyl-5-phenyl-isooxazolium-3-sulfonate (Woodward's Reagent K). The mixture was stirred for a few minutes while the temperature was maintained at 4 degrees centigrade. One hundred milligrams of chymotrypsin (CHT) dissolved in water (total volume 10 milliliters) was added to the reaction mixture. The stirring was continued for 16 hours until a white precipitate (condensed product) separated out. The precipitate was centrifuged, washed once with cold 0.1 M sodium chloride and twice with cold distilled water. The samples were dried at room temperature under reduced pressure and nitrogen determined by the Kjeldahl method, which gives data necessary to calculate the amount of bound protein in the polymer. The chymotrypsin activity of the samples was determined by a titrimetric method, using N-acetyl-tyrosine ethyl ester as substrate in a 0.01 M phosphate buffer at pH 7.5. NaOH solution (0.1 N) was used as a titrant.

The insoluble enzyme was obtained in a yield of 81 percent, having a protein content of 76 percent and a retained activity of 56 percent.

Additional insoluble enzyme compositions were prepared using the foregoing procedure but with varying proportions of reactants. The results are summarized in Table I.

Another series of experiments were performed using the test conditions of Example 1 except that acetic acid was used to precipitate the resultant insoluble enzyme. Precipitation occurred at about a pH of 4. The results are tabulated in Table II.

Similar results are obtained when other enzymes such as trypsin, urease are employed.

Similar results are also obtained when other ester forming compounds such as the carbodiimides and the carbodiimidazoles are employed.

Other carboxyl polymers may be used instead of the ethylene maleic anhydride copolymers employed in the previous examples. In the following examples a polyacrylic acid polymer in water solution (Good-rite K–714, B. F. Goodrich Chemical Co.) having a molecular weight of 200,000 to 250,000, a pH of 2–3 and a total solids of 15 percent was used. The general procedure of Example 1 was followed. In each case 150 milligrams of polyacrylic acid solids were employed.

TABLE I.—COMPOSITION AND ACTIVITY OF CHYMOTRYPSIN-EMA POLYMERS [1]

| Example | EMA/CHT, mg. | Woodward's reagent, g./1 g. EMA | Yield, mg. | Bound protein, percent | Activity retained, percent [2] |
|---|---|---|---|---|---|
| 2 | 100:100 | 0.372 | 122 | 61 | 22 |
| 3 | 600:100 | | 146 | 55 | 37 |
| 4 | 100:400 | | 360 | 75 | 11 |
| 5 | 100:100 | 0.303 | 97 | 59 | 22 |
| 6 | 600:100 | | 102 | 52 | 48 |
| 7 | 100:400 | | 261 | 70 | 7 |
| 8 | 100:100 | 0.251 | 98 | 58 | 23 |
| 9 | 600:100 | | 101 | 53 | 52 |
| 10 | 100:400 | | 269 | 69 | 6 |
| 11 | 100:100 | 0.202 | 130 | 61 | 25 |
| 12 | 600:100 | | 135 | 55 | 44 |
| 13 | 100:400 | | 251 | 69 | 10 |
| 14 | 100:100 | 0.186 (0.188) | 122 (152) | 61 (60) | 22 (26) |
| 15 | 600:100 | | 146 (170) | 55 (54) | 37 (55) |
| 16 | 100:400 | | 360 (307) | 75 (73) | 11 (8) |
| 17 | 100:100 | 0.145 | 158 | 64 | 20 |
| 18 | 600:100 | | 186 | 54 | 46 |
| 19 | 100:400 | | 257 | 71 | 9 |
| 20 | 100:100 | 0.093 | 121 | 60 | 9 |
| 21 | 600:100 | | 143 | 58 | 22 |

[1] Water system, 2 hour-reaction time and precipitation with conc. HCl to pH 3.
[2] All activities determined at pH 7.5.

TABLE II.—CHYMOTRYPSIN-EMA POLYMERS FROM ACETIC ACID

| Example | EMA/CHT, mg. | Woodward's reagent, g./1 g. EMA | Yield, mg. | Bound protein, percent | Activity retained, percent |
|---|---|---|---|---|---|
| 22 | 100:100 | [1] 1.480 | 63 | 72 | 40 |
| 23 | | [1] 0.740 | 60 | 81 | 41 |
| 24 | | 0.372 | | 83 | 66 |
| 25 | | 0.320 | 104 | 70 | 81 |
| 26 | | 0.240 | 88 | 67 | 88 |
| 27 | | 0.186 | [2] 73 | 77 | 78 |
| 28 | | 0.093 | 84 | 77 | 68 |
| 29 | | 0.046 | 82 | 82 | 78 |
| 30 | | 0.023 | 111 | 76 | 66 |
| 31 | | 0.006 | 109 | 76 | 72 |

[1] G./0.8 g. EMA.
[2] Experiment was carried out in phosphate buffer 0.01 M, pH 7.5.

EXAMPLE 32

One gram of 15.0% polyacrylic acid solution was dissolved in 5 milliliters of water. To this 1 N NaOH solution was added until pH 7 was attained. Woodward's reagent (1.5 g.), dissolved in about 10 milliliters of water, was added to the above solution, was cooled, and stirred for about half an hour. α-Chymotrypsin (0.150 g.) dissolved in 10 milliliters of water, was added to the reaction mixture and was stirred over a weekend (an overnight period is sufficient). The white precipitate which separated out was centrifuged, was washed three times with distilled water, and was dried at room temperature under reduced pressure. The yield was 0.250 gram (77% enzyme bound). Nitrogen analysis by Kjeldahl's method showed 7.1% ≡ 46 milligrams of enzyme/100 milligrams of polymer. Enzyme activity retained was 3.5 percent.

Other experiments employing different ratios of the reactants above were performed. The results are tabulated in Table III, in each example 150 mg. of polyacrylic acid was reacted.

TABLE III.—CHYMOTRYPSIN-POLY CRYLIC ACID POLYMERS

| Example | Chymotrypsin, mg. | Woodward's reagent, mg. | Percent activity retained |
|---|---|---|---|
| 33 | 150 | 500 | 7.1 |
| 34 | 300 | 500 | 26.0 |
| 35 | 300 | 250 | 57.0 |
| 36 | 300 | 10 | 76.0 |

Comparable results are obtained when other acid polymers including polyglutamic acid and polyamic acid polymers are employed.

The infrared spectrum of polyacryl-α-chymotrypsin was studied, with reference to the spectra of polyacrylic acid and α-chymotrypsin. α-Chymotrypsin showed NH band at 3μ, amide I band at 6.1μ, and amide II band at 6.6μ. Polyacrylic acid's main bands were carboxylic OH at 3.2μ and carboxylic carbonyl band at 5.9μ. The infrared spectrum of polyacryl-α-chymotrypsin incorporated characterization of both the parent compounds showing broad bands for NH, OH at 3μ, and carbonyl at 5.8μ and amide I and amide II bands at 6.1μ and 6.6μ respectively. The Σ values of these bands evidenced a high degree of condensation between polyacrylic acid and α-chymotrypsin.

EXAMPLE 37

Carboxymethylcellulose-α-chymotrypsin was prepared in the same way as mentioned above from carboxymethyl cellulose sodium salt (0.200 g.), Woodward's Reagent (0.3 g.), and α-chymotrypsin (0.2 g.). The reaction was carried at 5° C. in 0.2 M phosphate buffer pH 7.5. The compound was worked up by the same process as before. Yield was 0.200 g.

EXAMPLE 38

The procedure of Example 1 is followed in all essential details with the exception that 1-ethyl-3-(3-dimethylaminopropyl) carbodiimide is substituted for N-ethyl-5-phenyl isooxazolium-3-sulfonate to obtain chymotrypsin in insoluble form.

EXAMPLE 39

The procedure of Example 1 is followed in all essential details with the exception that 1-methyl-3-(3-dimethylaminopropyl) carbodiimidazole is substituted for N-ethyl-5-phenyl isooxazolium-3-sulfonate to obtain chymotrypsin in insoluble form.

EXAMPLE 40

The procedure of Example 1 is followed in all essential details with the execption that a mixture of dinitrophenol and 1 - cyclohexyl-3-(2-morpholinoethyl) carbodiimide metho P-toluenesulfonate is substituted for N-ethyl-5-phenyl isooxazolium-3-sulfonate to obtain chymotrypsin in insoluble form.

EXAMPLE 41

α-Chymotrypsin (300 mg.) is dissolved in 6 ml. of 0.2 M phosphate buffer at pH 7.0 and is cooled to about 5° C. To this a solution of Woodward's Reagent K (300 mg.) in water is added with stirring. 300 mg. of polyallylamine in water is then added with stirring and the reaction mixture is allowed to stand overnight at 5° C. On acidification with dilute hydrochloric acid insoluble chymotrypsin is obtained.

Insoluble enzymes are obtained when other reactive amines such as polyvinylamine and amino derivatives of ethylene/maleic anhydride copolymers are employed.

EXAMPLE 42

α-Chymotrypsin (300 mg.) was dissolved in 6 ml. of 0.2 M phosphate buffer at pH 7.5 and cooled. To this, a solution of Woodward's Reagent (300 mg. in ml. of water) was added, and the reaction mixture was left overnight at 5° C. On acidification, pH 3 with acetic acid, the poly-α-chymotrypsin precipitated out and was centrifuged and dried. The yield was 200 mg. of polymerized protein and a retained activity of 7–10 percent. Molecular weight determined by ultracentrifugation was about 350,000. α-Chymotrypsin's molecular weight is about 24,000.

In cluded in the scope of polycarboxyl polymers contemplated by this invention are shaped polymeric structures such as fibers and fabrics. These may be formed from synthetic polymers like those mentioned above such as acrylic homo- and copolymers, or natural polymers such as cotton, wool or the like. While the enzyme-polymer adduct can be first formed and then shaped into a fiber and insolubilized, preformed fibers and fabrics can also be used. Cotton oxidized to increase its carboxyl group content, using an oxidizer such as a base like NaOH for example, is favorably adapted for use as an insolubilizing enzyme substrate in accordance with this invention. The enzymatically active fabrics prepared by this invention are more convenient to apply to surfaces such as skin than are powders, such as the chymotrypsin enzyme powders presently used for wound debrielment, and with suitable enzyme activity can be used directly as bandages for burns, wounds and the like.

EXAMPLE 43

A strip 2 x 1 inches of cotton gauze was placed in a solution of 0.576 gram (g). of NaOH in 20 milliliters (ml.) of water, and the solution was heated at 85° C. for an hour and then cooled to room temperature (about 25° C.). The gauze was then soaked for 0.75 hour in a solution of 0.033 g. Woodward's Reagent K in 10 ml. water, after which it was removed and soaked for an hour in a solution of 0.010 g. chymotrypsin in 5 ml. water, both at room temperature. Finally, the gauze was washed with 0.1 M aqueous NaCl and then twice with water, and blotted until the strip was no longer dripping wet. The wash water was free of chymotrypsin, showing that any present was insolubilized.

To measure the activity of the enzymatically active fabric prepared as stated, plates were prepared of 2 g. gelatin in 30 ml. water. The treated gauze strip was cut in half. One was placed on a gelatin plate immediately, and the other was left to dry under vacuum. As controls, gauze strips soaked in aqueous chymotrypsin (ChT) solution and containing respectively about 1.6 mg., 2.2 mg., and 4.5 mg. ChT were placed in other gelatin plates, and gauze strips soaked respectively in NaOH and in NaOH and Woodward's Reagent solutions as described above were placed on other plates. Later, the vacuum-dried treated gauze was placed on another gelatin plate. The plates were each observed for gelatin liquefaction, which is produced by chymotrypsin activity, with results as tabulated below, showing activity for the damp treated gauze equivalent to that of the gauze carrying 1.6–2.2 mg. of chymotrypsin, as measured by amount of liquid formed.

3. The process of claim 2 wherein the acid polymer is an ethylene maleic anhydride copolymer.

4. The process of claim 2 wherein the acid polymer is polyacrylic acid.

5. The process of claim 1 wherein the carboxyl moiety is an enzyme.

6. The process of claim 1 wherein the reactive amine is an enzyme.

7. The process of claim 1 wherein the reactive amine is polyallylamine.

8. The process of claim 1 wherein the ester forming compound is a 3-unsubstituted isooxazolium salt.

9. The process of claim 8 wherein the salt is N-ethyl-

|  | Liquidity | | | | |
|---|---|---|---|---|---|
| Elapsed time, hrs | 1 | 2 | 4 | 13 | 39 |
| Sample: | | | | | |
| Insolubilized ChT gauze | None | Some | Great | Extremely | |
| 1.6 mg. soluble ChT | Slight | do | do | do | |
| 2.2 mg. soluble ChT | do | do | do | do | |
| 4.5 mg. soluble ChT | do | Large | Large | do | |
| NaOH | None | None | None | None | None. |
| NaOH plus Woodward's reagent | do | do | do | do | Do. |
| Vacuum dried gauze | | | | (Applied) | Some. |

The foregoing examples and methods have been described in the foregoing specification for the purpose of illustration and not limitation. Many other modifications and ramifications will naturally suggest themselves to those skilled in the art based on this disclosure. These are intended to be comprehended within the scope of this invention.

What is claimed is:

1. A process for preparing water-insoluble enzymes which comprises (1) esterifying a carboxyl containing moiety selected from the group consisting of an enzyme and a polyacidic polymer with a compound selected from the group consisting of a 3-unsubstituted isooxazolium salt, a carbodiimide and a carbodiimidazole to form an activated ester (2) condensing said ester with reactive amine moiety to form a water-insoluble enzyme provided that at least a portion of the carboxyl containing moiety or the reactive amine moiety is an enzyme.

2. The process of claim 1 wherein the carboxyl moiety is derived from an acid polymer.

5-phenyl isooxazolium-3-sulfonate.

10. The process of claim 1 wherein the reaction is carried out at a temperature of from about —5 to about 30° C.

11. The process of claim 1 wherein the reaction is carried out at a pH of from about 6.5 to 7.0.

12. The process of claim 1 wherein the ratio of ester forming compound to carboxyl reactant is less than .5:1 on a molar weight basis.

13. The product produced by claim 1.

14. The process of claim 1 wherein the carboxyl moiety is derived from a fiber of an acid polymer.

References Cited

Levin et al.: Biochemistry, vol. 3, No. 12, pp. 1905–1913 (December 1964).

LIONEL M. SHAPIRO, Primary Examiner

U.S. Cl. X.R.

195—68, Dig. 11; 424—50, 94